Patented Aug. 29, 1944

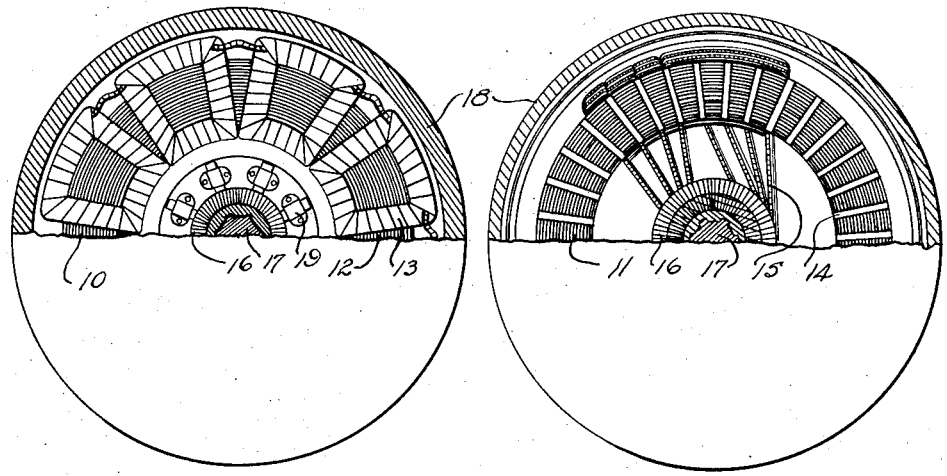
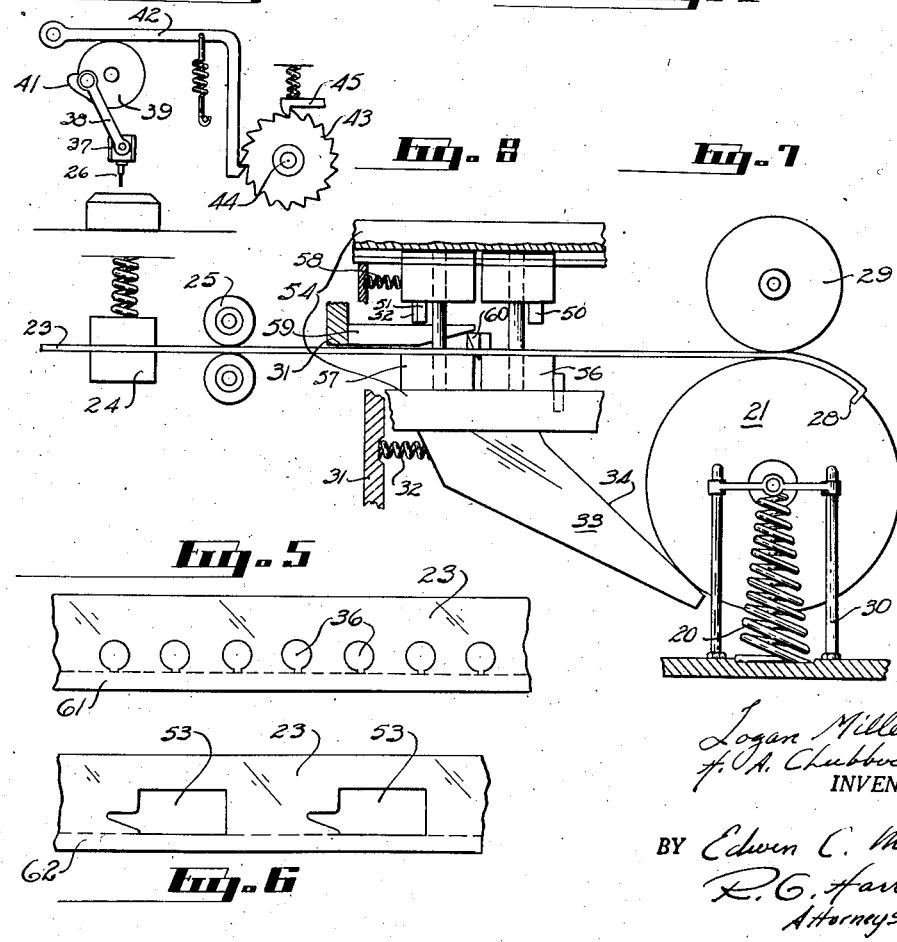

2,357,017

UNITED STATES PATENT OFFICE 2,357,017

ELECTRICAL APPARATUS AND METHOD

Logan C. Miller, Ann Arbor, and Horace A. Chubbuck, Dearborn, Mich., assignors to Ford Motor Company, Dearborn, Mich., a corporation of Delaware Application February 12, 1943, Serial No. 475,636

11 Claims. (Cl. 164—87)

This invention relates to electrical machinery; and, more particularly, to a method of constructing laminated cores for armature and field pieces and a machine upon which this method may be carried out.

In the discussion of the advantages of cores formed according to this method, reference is made to copending application Serial No. 383,361, of which this is a continuation in part, and to Patent No. 2,302,013 showing a representative use of this type core. The purpose of the present invention is to devise both a method by which cores having circumferential laminations formed by winding a continuous strip may be manufactured in quantity and with the requisite uniformity and a machine upon which the method may be practiced.

An advantage of the invention is that these ring cores may be readily formed from strip stock incorporating spaced recesses in which electrical windings may be secured, and these recesses will extend radially, provision being made automatically for their increased spacing as the diameter of the core increases. Another advantage is that automatic means are provided to increase the latitude of the recesses as the core diameter increases when that is desirable for electrical reasons.

With these and other objects in view, the invention consists in the arrangement, construction and combination of the various parts of the approved device and method, as described in the specification, claimed in the claims, and illustrated in the accompanying drawings in which:

Fig. 3 and Fig. 4 are partial plan views of a field and armature core, respectively, indicating the method of wiring.

Fig. 5 and Fig. 6 are portions of the stamped strip forming the armature and field core, respectively.

Fig. 7 is a schematic diagram showing the operation of the machine used to punch the field slot.

Fig. 8 is a schematic diagram of the interlocking mechanism between the punching and the winding means.

Figure 1:
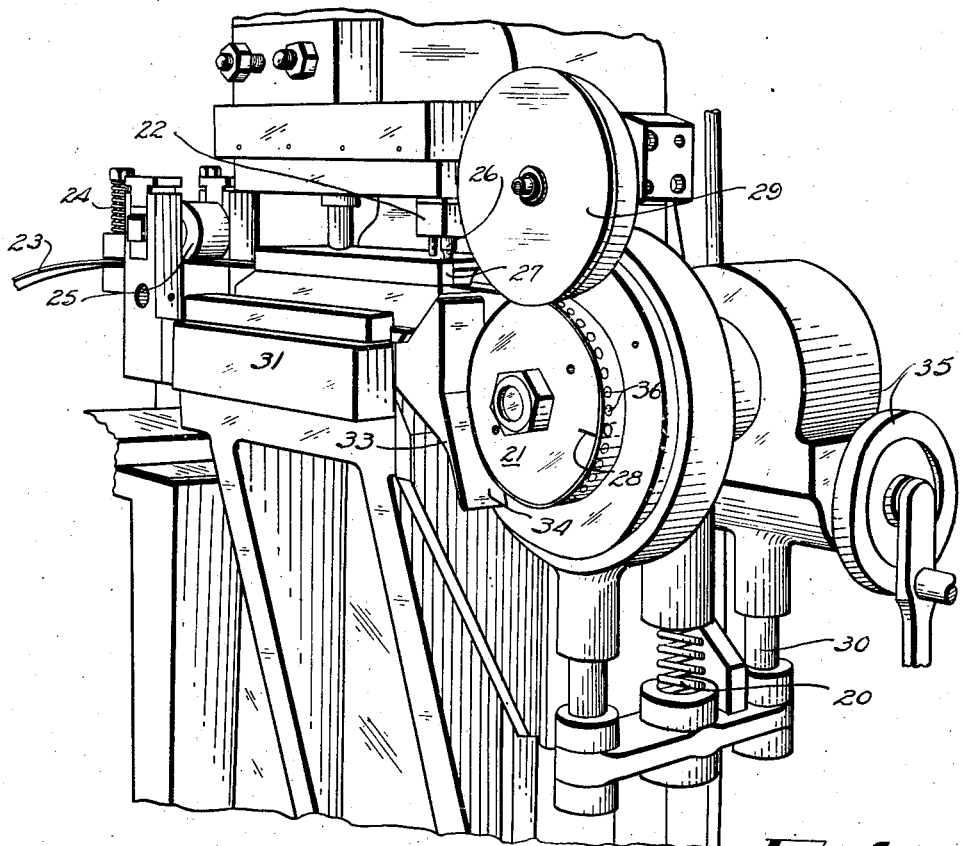
Fig. 1 is a perspective view of the machine used to form the core.

Referring first to Fig. 3 and Fig. 4, 10 indicates a field element and 11 an armature element constructed according to this invention; that is, by spirally winding a thin, narrow, continuous strip of electrical steel stock to form a laminated core of the desired dimensions. Slots 12 are formed in one side of the field coil 10 and receive the field windings 13. Similarly, armature slots 14 receive the armature windings 15 which, in turn, are connected to the commutator segments 16. The armature is mounted on a shaft 17 which is rotatably mounted in the casing 18 to which are secured the brushes 19. These details of the electrical apparatus, as such, will be found in the copending application and patent referred to.

Figure 2:
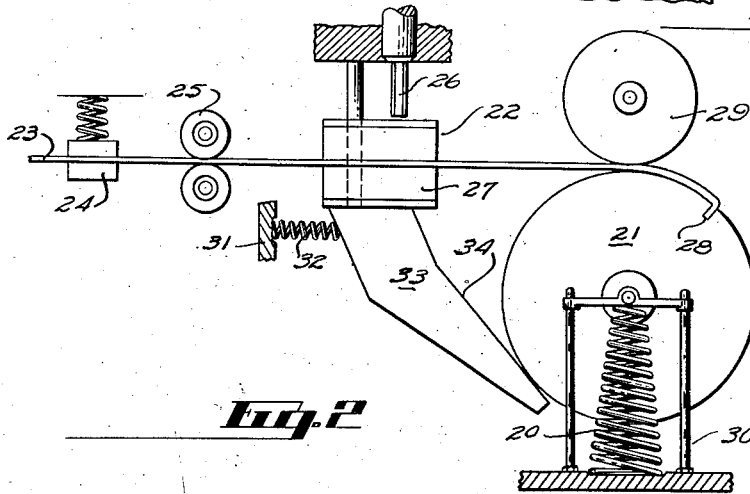
Fig. 2 is a schematic diagram showing the operation of the machine in Fig. 1.

Fig. 1 shows the machine which has been developed to fabricate cores of this type, and concurrent reference to this and Fig. 2 will indicate its method of operation. In essence, this comprises an intermittently rotating indexing form 21 and a punch means 22, the strip stock 23 leading through a tension brake 24 and the guide rollers 25 between the punch 26 and anvil 27, from which it passes to the form 21 and is anchored in place in the notch 28. An axially-fixed, flanged pilot wheel 29 overlies the form 21 and insures proper positioning of the strip stock thereon, the form 21 being mounted on springs 20 and columns 30 and being depressed as the thickness of the wound stock increases. The punch 26 and anvil 27 are slidably mounted on the bed 31 of the machine and are resiliently urged toward the form 21 as by spring 32. Secured to the anvil is a cam 33 whose inner face 34 rests against the circumference of the form 21 or the stock rolled on it as operation progresses. It will be apparent that as the laminations of stock increase on the form, the punch and anvil will be displaced toward the left against the resiliency of the spring and, consequently, the distance between successive punches will be increased a minute fraction at every operation, thereby insuring proper spacing of the slot hole in the strip to form radially disposed slots in the completed ring.

In operation, the form 21 is intermittently rotated, as controlled by indexing means 35, through that portion of circumference corresponding to the desired angular spacing of the slots. When the slot comes to rest, the punch 26 is actuated in punching out a hole 36; the form is indexed again through the angle chosen, another hole is punched, and so on. Means are also provided so that this operation may be done automatically, Fig. 8 showing this schematically. The punch 26 is carried on a crosshead 37 driven through a connecting rod 38 by the crank 39 of the punch press. The crank has a cam surface 41 co-operating with a pivoted cam follower 42 that engages a ratchet wheel 43 secured on the shaft 44, which, in turn, carries the form 21. The dog 45 is provided to prevent reverse motion. Each operation of the punch 26 causes the ratchet wheel 43 to advance one tooth, for corresponding motion of shaft 44 and the form 21. The number of teeth on the ratchet would, of course, conform to the number of slots desired in the finished armature.

It is apparent that as the form rotates intermittently, the punch is operated at the end of each rotation and a hole is punched. As the number of layers of stock increases on the form, the punch and anvil are displaced toward the left, thereby automatically increasing the distance between successive punches and insuring a true radial slot in the completed armature.

However, particularly in field cores where the windings are very heavy, the slots are not only radially arranged, but it is also desirable to have them extend in width as the diameter of the core increases. This can be seen by referring to Fig. 3 in which it will be noted that the slots have this desired conformation. In order to obtain this spacing in the present machine, the second form of punch and anvil are incorporated. Again referring to Fig. 1, concurrently with Fig. 7, the single punch and anvil 26 and 27 are replaced by two punches 50 and 51, the former being rectangular in shape to punch the leading portion of the field slots, and the latter having an extending point 52 to punch the rear end of the slot. Their combined action results in a stamped hole such as shown at 53 in Fig. 6. Again, the form 21, tension brake 24, guide rollers 25 and pilot wheel 29 are shown. A sliding carriage 54 carries the cam 33 which co-operates with the form 21. To this carriage are secured the leading punch 50 and its corresponding anvil 56, while slidably supported on the carriage are the trailing punch 51 and its anvil 57, this combination being resiliently urged toward the right by spring means 58. Secured to the machine proper is a secondary cam 59 which co-operates with a follower 60 mounted on the carriage 54 and adapted to slide vertically between the anvils 56 and 57.

In operation, as the form rotates intermittently, the punches 50 and 51 are operated simultaneously according to the mechanism shown in Fig. 8 and two holes are punched at spaced intervals, each forming a portion of two complete slot holes which are completed by the preceding and succeeding punching operation. As the lamination is built up on the form, the sliding carriage 54 is displaced to the left due to the increase of the metal thereon, and both punches and anvils are carried with it. However, as the carriage so moves, the cam 59 forces the follower 60 downwardly, thereby urging the trailing punch and anvil toward the left against resiliency of the spring 58 and increasing the distance between punches 50 and 51. This, in effect, lengthens the hole punched since as originally spaced, the action of the two punches overlaps. In this manner, not only are the slots radially disposed but also increase in width as the diameter of the ring increases.

As was noted in the prior application, it is frequently found advisable to punch the hole interiorly of the strip stock, as shown in Fig. 5 and Fig. 6, to prevent deformation of the stock under the tension imposed upon it. Thereafter, small edge strips indicated as 61 and 62, respectively, are turned off along the dotted line and the slots are opened, resulting in the core, as shown in its finished form in Fig. 3 and Fig. 4.

It is not thought that extended discussion of the advantages of this invention is required in the present instance since they have been fully treated in our prior application covering other phases of this invention, and reference to these will show specific installations to which they are adapted as well as the advantages which flow from them.

Some changes may be made in the arrangement, construction and combination of the various parts of the improved machine and the method of operation thereof, without departing from the spirit of the invention, and it is the intention to cover by the claims such changes as may be reasonably included within the scope thereof.

The invention claimed is:

1. A method of constructing cores of electrical machines, which comprises spirally winding strip stock, providing intermittent rotation of the winding means by which said strip is wound into a laminated ring, initially operating a first forming means in the intervals between the operation of said winding means to form an opening in said stock, subsequently operating a second forming means to increase the size of the opening in said stock, automatically changing the distance between said forming means and said winding means proportionately as the thickness of said ring increases, and automatically varying the relative position of said first and second forming means to increase the size of said opening proportionately as the thickness of said ring increases.

2. A method of constructing cores for electrical machines, which comprises the steps of spirally winding strip stock to form a laminated ring, causing said winding to proceed intermittently, forming a portion of a hole in said stock between periods of winding, subsequently forming the remainder of said hole in said stock, compensating for the increase in diameter of said ring during the winding process by increasing the distance between said forming device and said winding device during the winding process, and varying the size of said hole by relatively changing the position of the forming means to increase the size of the resulting opening, whereby said holes are so spaced that said holes in each lamina align radially with corresponding holes in subsequent laminae and the slots formed in said ring increase in width as the diameter of said ring increases.

3. A method of constructing cores for electrical machines, which comprises the steps of spirally winding strip stock to form a laminated ring, forming spaced successive holes in said stock prior to winding, increasing the distance between said spaced holes as the diameter of said ring increases, and increasing the size of said holes as the diameter of said ring increases.

4. An apparatus for constructing cores of electrical machines from strip stock, comprising a winding form, means by which said form may be intermittently rotated through successive fixed angles, a forming means, means on said form for securing strip stock thereto whereby said strip stock may be drawn through said forming means by said rotation, compensating means between said winding form and said forming means in contact with said wound material and responsive to successive thickness of said strip on said form whereby the distance between said winding form and said forming means is automatically increased, and the synchronizing means between said winding form and said forming means by which said forming means is operated during intervals in rotation in said winding.

5. An apparatus for the fabrication of cores for electrical machines, a winding means, a forming means, said winding means being arranged for limited translation in one direction, said forming means being arranged for limited translation in a direction substantially normal to that of said winding means, cam means operable between said forming means and said winding means where the distance between said forming means and said winding means is automatically increased as material is wound on said winding means.

6. An apparatus of the type described, a form, a punch, said form designed to draw strip material through punch and wind same on said form, a pilot wheel co-operating with this form, said form and said pilot wheel being arranged for relative movement in one direction in proportion to the amount of material wound on said form, said punch being arranged for translation in a direction away from said form, means operable between said punch and said form by which the distance between said punch and said form is increased in proportion to the amount of material wound on said form, said form being arranged for intermittent rotation through fixed successive angles, and said punch connected therewith for the operation on said stock between periods of rotation of said form.

7. An apparatus for the fabrication of cores for electrical machines comprising, a winding means, a forming means, said forming means comprising a plurality of punch means designed to punch holes in strip stock to be wound on said winding means, means to increase the spacing between said punch means and said winding means as said strip stock is wound on said winding means, and means to increase the distance between said plurality of punches in said punch means, said variation in spacing between said punch means and said winding means and between said plurality of punch means increasing proportionately as material is wound on said winding means.

8. An apparatus for constructing cores for electrical machines with the use of strip stock comprising, a winding form, means by which this form may be intermittently rotated through successive angles, a forming means, means operable between said winding form and said forming means proportionately responsive to successive thicknesses of said strip wound on said form, whereby the distance between said winding form and said forming means is automatically increased, said forming means comprising a plurality of punches operating on said strip stock, and automatic means operable between said punches to increase the distance therebetween as strip stock is wound on said winding means.

9. An apparatus for the construction of cores for electrical machines from strip stock comprising, a winding means, a forming means, said winding means being designed to draw strip material through said forming means and wind same in a laminated ring, said winding means arranged to rotate intermittently through predetermined angles, said forming means arranged to operate on said stock concurrently between said winding operation, means to vary the distance between said forming means and said winding means in proportion to the increase in diameter of said core, said forming means comprising a plurality of punches successively operating on said strip stock to form a single opening therein, and means varying the distance between said punches to increase the size of said opening in proportion to the increase in diameter of said ring.

10. The method of constructing cores for electrical machines, which comprises the steps of spirally winding strip stock to form a laminated ring, causing said winding to proceed intermittently, forming holes in said stock between said periods of winding, compensating for the increase in diameter of said ring during the winding process by increase in distance between the points of forming said successive holes in the wound strip during the winding process, whereby said holes are so spaced that said holes in each lamina align radially with corresponding holes in subsequent laminae, and further characterized in obtaining said compensation directly by causing the increase in diameter of said ring, during successive stages of formation, to provide said increase of distance between said points of forming.

11. The method of constructing cores of electrical machines, which comprises the steps of winding by spiral rotation a strip of stock to form a laminated ring thereof, passing said stock through a forming means, operating said forming means between periods of operation of said winding means, whereby holes are formed at intervals increasingly spaced in proportion as the diameter of said ring increases, whereby the holes of each lamina align with corresponding holes in subsequent laminae to form radial slots in said core, said holes being formed interiorly of said strip, and material between said holes and one edge of said strip being removed after the completion of said winding step.

LOGAN C. MILLER.
HORACE A. CHUBBUCK.